United States Patent [19]

McBride

[11] 4,189,460

[45] Feb. 19, 1980

[54] CHEMICAL OXYGEN GENERATOR AND PROCESS OF MAKING A GENERATOR

[75] Inventor: William S. McBride, Lübeck, Fed. Rep. of Germany

[73] Assignee: Drägerwerk Aktiengesellschaft, Fed. Rep. of Germany

[21] Appl. No.: 844,058

[22] Filed: Oct. 20, 1977

[30] Foreign Application Priority Data

Nov. 3, 1976 [DE] Fed. Rep. of Germany ....... 2650349

[51] Int. Cl.$^2$ ............................................ B01J 7/00

[52] U.S. Cl. ...................................... 422/165; 102/39; 29/157 R; 29/455 LM; 422/166

[58] Field of Search .................. 23/281, 282; 86/1 R, 86/20 R; 126/263; 102/39, 99, 100, 101, 102; 264/263; 53/30 R; 29/455 LM, 157 R

[56] References Cited

U.S. PATENT DOCUMENTS

| | | | |
|---|---|---|---|
| 2,764,475 | 9/1956 | Bovard et al. | 23/281 |
| 2,970,414 | 2/1961 | Rohdin | 53/30 X |
| 3,516,797 | 6/1970 | Bovard et al. | 23/281 |
| 3,726,649 | 4/1973 | Pelham | 23/281 |

*Primary Examiner*—Michael S. Marcus
*Attorney, Agent, or Firm*—McGlew and Tuttle

[57] ABSTRACT

A chemical oxygen generator using a chemical which generates oxygen by thermal reaction and an ignition device for the chemical is made by forming a continuous depression in a first plate, filling the plate depression with the chemical so as to completely fill the depression or to slightly overflow it, locating the ignition device in the depression adjacent one end thereof and covering the first plate with a second flat plate and pressing the two plates together to compact the chemical and deform the depression of the first plate. The plates are subsequently secured together with a gas-tight connection around the depression. The generator advantageously comprises a continuous serpentine-like depression in one plate and has a closed end located in the plate and an open end extending to the edge of the plate which may be sealed by a foil when the two plates are pressed together. The ignition device is located adjacent the open end and it may be activated to cause the production of the oxygen from the open end successively to the closed end.

3 Claims, 8 Drawing Figures

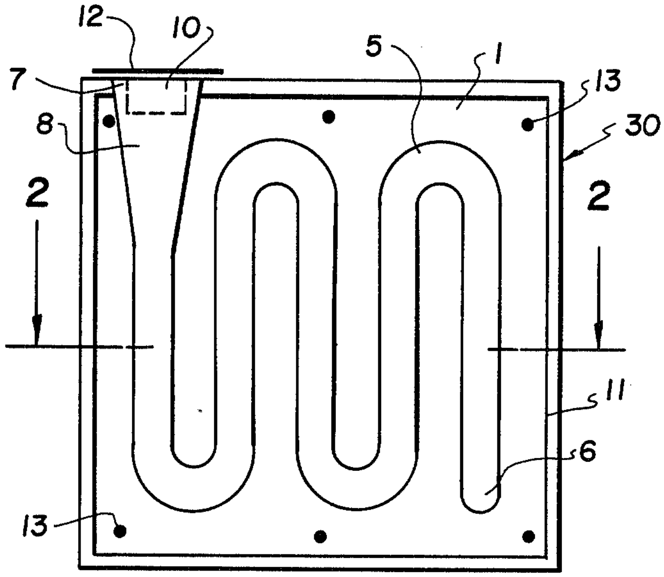
FIG. 1
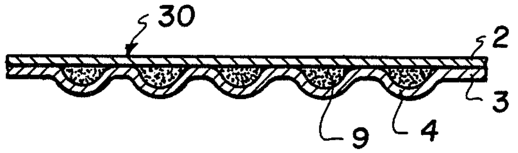
FIG. 2
FIG. 3
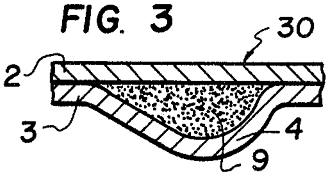
FIG. 5
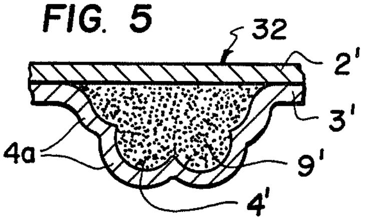
FIG. 4
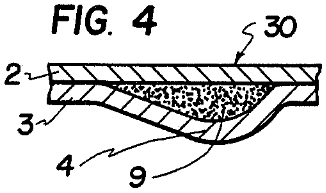
FIG. 6
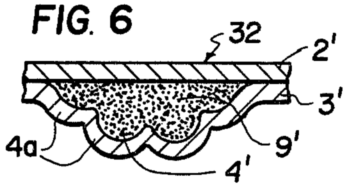

CHEMICAL OXYGEN GENERATOR AND PROCESS OF MAKING A GENERATOR

FIELD AND BACKGROUND OF THE INVENTION

This invention relates in general to the construction of oxygen generators and, in particular, to a new and useful oxygen generator and method of making the same which includes a depression or recess formed between two juxtaposed plates which is filled with a chemical which generates oxygen by thermal reaction and an ignition device for the chemical.

DESCRIPTION OF THE PRIOR ART

Chemical oxygen generators are used in respirators and resuscitation apparatus to make a supply of oxygen available. In chemical oxygen generators, the oxygen is present in chemically combined form and is released in the course of a chemical reaction when needed. For a controlled occurrence of the reaction, the chemical composition must be present in a defined, uniform density.

A chemical oxygen generator is known wherein the actual generator body is produced in various ways from the chemical mixture and is then placed in a hermetically closed sheet metal container. For the production of a solid, self-supporting generator body, the following methods enter into consideration: The chemical mixture in powder form is wetted with trichlorotrifluroethane, pressed in a press mold, and after removal from the mold, is then dried in an oven. The pressing is carried out in several steps, with the material for an ignition cone being worked into one end of the generator body.

The chemical mixture, in powder form, is compacted dry and a place for the insertion of an ignition cone is provided at one end of the generator body. The chemical mixture is heated to a viscous state and is poured into a mold. The separation from the mold occurs by shrinkage of the molded generator body upon cooling. The chemical mixture is extruded from the hot melt.

When using the pressing method, the desired density of the generator body is determined by the pressing pressure to be applied. To initiate the reaction when going into operation, one has the alternatives of igniting the ignition cone with a match or with an electric ignition wire, or if the ignition cone is ignitable by addition of water, by breaking a water-filled glass ampoule. A disadvantage of this method is that because of difficulties in pressing or removal from the mold or because of the lack of stability in handling, it is not possible to make oxygen generators with generator bodies of small cross-section and great length, as is desired for the generation of a small oxygen stream (that is, the quantity of oxygen released per unit time) at prolonged period of use. (DT-AS No. 21 42 185).

The housing in a known chemical oxygen generator comprises a cylindrical sheet metal container. A chlorate candle is lodged therein as the oxygen-generating chemical composition. It has the form of a hexagonal column, which tapers to one end in hexagonal form and toward the other end to a rectangle whose narrow sides concord with the two opposite sides of the hexagon. The chlorate candle is a form-stable compact which is mounted between flexible mats at its end faces, and is centered by a baffle plate. The long sides are without insulation and are located at a sufficient distance from the wall of the container for the passage of the oxygen.

The rectangular end of the compact rests on the bottom of the container via the supporting mat. The form of the compact, tapered on both sides, is to bring about a uniform oxygen evolution. The disadvantage in this is that the form of the chlorate candle can be modified only within narrow limits and, in particular, a design of the oxygen generator with a chlorate candle having a small cross-section and great length is not possible, because the stability of the compact in handling would be too low, the introduction of the compact into the container difficult, and the external form of the oxygen generator unmanageable. The manufacture is complicated by the subsequent insertion of the chlorate candle into the container and must rely on observance of tolerances between chlorate candle and the container, (U.S. Pat. No. 3,861,880).

SUMMARY OF THE INVENTION

The invention provides a process for the manufacture of a chemical oxygen generator in a rational manner with differently determined reaction characteristics. The chemical oxygen generator manufactured by the process is inexpensive, safe in use, and optimally suited for its special use.

The process according to the invention comprises filling the chemical composition into a depression or recess in a plate and after covering with a flat plate, connecting the two plates together by spot-welding and pressing them together in an isostatic pressing device with deformation of the depression, and then hermetically closing their superposed edges.

The advantages achieved with the invention are, above all, that sturdy oxygen generators can be produced in a rational manner with container forms and arrangements of the chemical composition selectable within wide limits. With the method of producing the chemical composition into the container and subsequent pressing of the chemical composition including the container, shapes become possible which were not obtainable with earlier methods, because the subsequent introduction of a preshaped chemical composition compacted into narrow, deep and possibly curved containers was not possible. By the enveloping container, surrounding and connecting the course of the chemical composition, the oxygen generator is stable and the chemical composition is compactly protected at the moment of formation, so that damage during installation, storage and use cannot occur. Thereby, in connection with the uniform pressing, high safety in use against irregularities of the oxygen generation is ensured. By the shape of the container and its sections determining and connecting the course of the chemical composition, the course of the oxygen generation suitable for the specific case can be achieved directly by the predetermined distribution of the resulting heat of reaction. The distribution of the heat of reaction by transfer into the environment or preheating of adjacent zones affects the reaction velocity thereof through the temperature of the chemical composition.

The distribution of the heat of reaction can also be influenced by selection of the material and wall thickness of the container. Arrangements of the chemical composition with small cross-section at great lengths are reliably controllable. Thereby, the manufacture of oxygen generators which give off a moderate oxygen stream over a prolonged period of time is possible. The forms of the containers can be adapted to the requirements of the equipment in which they are used.

In another embodiment of the invention, the chemical composition is filled in over an auxiliary cone into a space formed between two contiguous tube pieces, of which the outer piece is provided with a depression or recess and the outer tube piece is then slipped axially over the inner tube all the way to close the tube pieces hermetically at their superposed edges and thereafter the tubes are pressed against each other in an isostatic pressing apparatus so as to effect a formation of a depression.

The previously described advantages are also achieved with this solution. Moreover, the tube form offers the advantage, besides being of high stability, and of a good space utilization inside the apparatus whose oxygen source is constituted by the oxygen generator, in that parts of the apparatus, such as the infeed hose and oxygen mask, can be accommodated in the interior of the tubular oxygen generator in a state of readiness.

As a variant of the invention, the cross-section of the wall of the depression or recess of the plate and of the outer tube piece has the form of an angle with unequal legs, or it consists of several arc sections connected together with the formation of breakpoints or bends. These initial forms are expedient, as they show a definite folding behavior during the isostatic pressing, so that a uniform cross-section after the pressing, and thus, a coherent course of the chemical composition after the pressing is ensured.

In another variation, the longitudinal axis of the depression is tortuous. In a tortuous form, a favorable accommodation especially of narrow and long depressions in a small space is possible. By the arrangement of the turns and their mutual distance, the distribution of the heat of reaction and, hence, the oxygen generation, can be influenced.

As a further variation of the invention, the depression varies in cross-section over its longitudinal axis making it possible to provide structurally for an irregular oxygen stream.

Accordingly, an object of the invention is to provide a process for manufacturing a chemical oxygen generator using a chemical which generates oxygen by thermal reaction and an ignition device for the chemical, which comprises, forming a continuous depression in a first plate, filling the first plate depression with the chemical so as to overflow the depression or to substantially fill it to the top, placing the ignition device in the depression adjacent an end thereof, covering the first plate with a second flat and pressing the two plates together to compact the chemical and deform the depression of the first plate and thereafter securing the plates together with a gas-tight connection.

Another object of the invention is to provide an oxygen generator which comprises first and second juxtaposed plates which are formed so as to define a continuous recess therebetween which has one end which is closed and an opposite end which is openable for ignition purposes and including a chemical in the recess which generates oxygen by thermal reaction and an ignition device in the recess adjacent the openable end thereof for igniting the chemical.

A further object of the invention is to provide an oxygen generator which is simple in design, rugged in construction, and economical to manufacture.

The various features of novelty which characterize the invention are pointed out with particularity in the claims annexed to and forming a part of this disclosure. For a better understanding of the invention, its operating advantages and specific objects attained by its uses, reference should be had to the accompanying drawing and descriptive matter in which there are illustrated preferred embodiments of the invention.

BRIEF DESCRIPTION OF THE DRAWINGS

In the drawings:

FIG. 1 is a front elevational view of an oxygen generator constructed in accordance with the invention;

FIG. 2 is a section taken along the line 2—2 of FIG. 1;

FIG. 3 and FIG. 4 are sectional views, similar to FIG. 2, showing the initial configuration of two plates and the recess defined therebetween before and after compression, respectively;

FIGS. 5 and 6 are views, similar to FIGS. 3 and 4 of another embodiment of oxygen generator;

DESCRIPTION OF THE PREFERRED EMBODIMENTS

Figure 7:
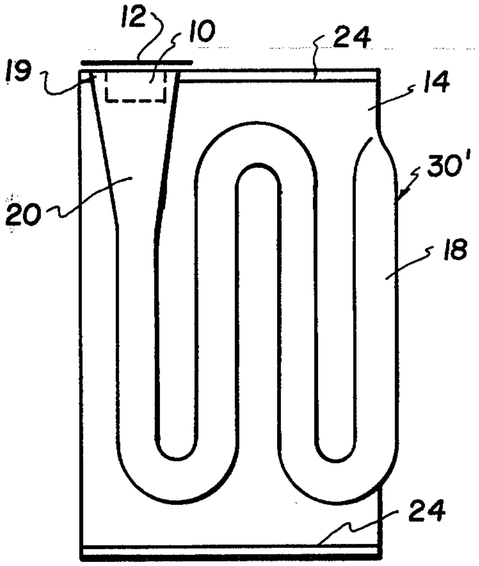
FIG. 7 is a side elevational view, similar to FIG. 1, of another embodiment of the invention.

Referring to the drawings in particular, the invention embodied therein in FIGS. 1 through 4, comprises an oxygen generator, generally designated 30, which comprises a container 1 made up of a first plate 2 which is advantageously a flat plate and a second plate 3 which define between them a series of depressions or recesses 4 which are filled with a chemical which generates oxygen by thermal reaction.

Plates 2 and 3 are made of soft steel plate such as sheet metal. The course of the depression 4 has the form of a serpentine 5 with one end 6 being closed and the other end 7 being open toward the edge of plate 3 via an enlargement 8. Serpentine 5 is formed of a plurality of spaced parallel straight leg portions and interconnected curved portions. The space enclosed by the depression 4 between plates 2 and 3 contains the oxygen-yielding chemical composition 9 and, at the open end 7, contains a known ignition device 10, for example, a breakable water ampoule. The superposed edges of plates 2 and 3 are connected gas-tight by the circling electric seam weld 11. During storage, the open end 7 is closed and protected by a foil 12.

The production of the oxygen generator according to FIGS. 1 and 2 is carried out by first placing the plate 3 horizontally with the opening of the depression 4 being oriented upwardly. In the untreated state, the preshaped depression 4 has a cross-section either according to FIG. 3 or to FIG. 5. Depression 4 is then filled with the chemical composition 9. Instead of positioning the ignition device 10 at the open end, there is inserted at first a space holder of the same size, which has not been shown. After the flat plate 2 has been placed on, plates 2 and 3 are connected by spot welds 13. Thereafter, the entire arrangement is placed in the elastic uptake container of an isostatic pressing device and set under hydraulic pressure acting on all sides. A compacting of the chemical composition 9 occurs there to a state required for the reaction to take place properly. The walls of the depression 4 which transmit the external pressure to the chemical composition 9 then change over from the form shown in FIGS. 3 and 5, respectively, to the form shown in FIGS. 4 and 6, respectively, undergoing folding. After the pressing, the edges of the oxygen generator, except for the open end 7, are closed gas-tight by the seam weld 11, the ignition device 10 is installed after the space holder is removed, and the open end 7 is closed by the foil 12. The generator 32 shown in FIGS. 5 and 6 has a wall 3 bounding the depression with a plurality of curved or arcuate portions 4*a* four of which are shown. In FIGS. 5 and 6, similar parts to FIGS. 3 and 4 are designated with primes. Of the four arcuate portions which form a fluted surface in depression 4′, two are raised or spaced from plate 2′ and two are adjacent it.

In service, the oxygen generator is connected with an apparatus (not shown) which includes, in addition to the mount for the oxygen generator, means for the absorption and distribution of the oxygen produced. After at least partial removal of the foil 12, by actuation of the ignition device 10, the reaction of the chemical composition 9 is initiated, which propagates from the open end 7 gradually through the chemical composition 9 to the end 6. The oxygen produced issues at the open end 7. As a result of the enlargement 8, larger cross-sections result at the beginning of the reaction and hence a greater oxygen stream than in the further course. This may be desirable for the filling and flushing of the receiving apparatus.

Figure 8:
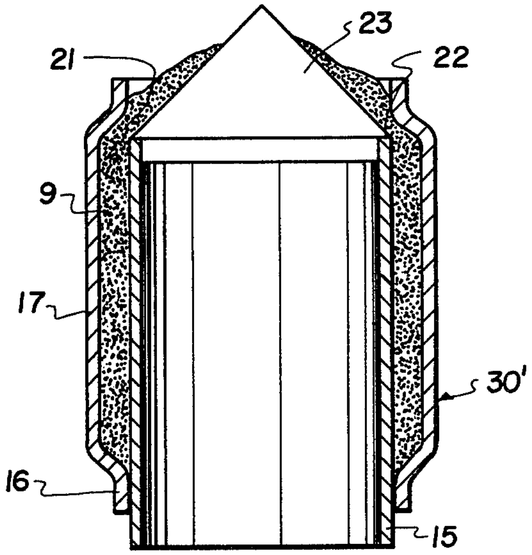
FIG. 8 is a transverse sectional view of the device shown in FIG. 7.

FIGS. 7 and 8 show an oxygen generator 30′ of cylindrical construction. A cylindrical container 14 of the oxygen generator comprises an inner, smooth tube section 15 and the outer tube section 16, provided with a depression or recess 17. Depending on the given facts, the tube sections may be fabricated by production from tubing, from plates with subsequent rounding and welding, or in other ways. The depression 17 has the form of a serpentine 18 which, except for its arch, corresponds to FIG. 1. At its one end 19, it is open via the enlargement 20 toward the end face of the tube section 16. There it contains the ignition device 10 and is closed and protected during storage by foil 12. The space enclosed between the tube sections 15 and 16 by the depression 17 contains the chemical composition 9.

The filling of the chemical composition 9 occurs according to FIG. 8 in that the tube sections 15 and 16 are pushed one into the other so far that the upper parts 21 of all turns of the serpentine 18 still protrude unclosed over the upper end face 22 of the inner tube section 15. At the points in contact, the tube sections 15 and 16 fit together movably but without play. During the filling operation, the interior of the tube section 15 is covered by an auxiliary cone 23 placed on the end face 22. After the filling is completed, the tube sections 15 and 16 are telescoped completely and excess chemical composition 9, as well as the auxiliary cone 23, are removed. The closing of the edges by welds 24 then occurs, the pressing and the further steps in the production are carried out in a manner analogous to that described above for the flat construction of FIGS. 1 to 6.

While specific embodiments of the invention have been shown and described in detail to illustrate the application of the principles of the invention, it will be understood that the invention may be embodied otherwise without departing from such principles.

What is claimed is:

1. An oxygen generator, comprising first and second juxtaposed deformable sheet metal plates, said second plate being formed with a continuous axially elongated serpentine recess covered by said first plate having one end which is closed and an opposite end which is openable for ignition, said first plate being flat, said serpentine recess comprising a plurality of spaced parallel straight leg portions and interconnected curved portions, a granular chemical which generates oxygen by thermal reaction disposed in said recess, an ignition device in said recess adjacent the openable end of said recess for igniting said chemical, said plates being deformed by isostatic pressure to reduce the size of said recess so that said chemical is compacted therein, the cross-section of said recess comprising four arcuate portions which form a fluted surface in said recess, the middle two arcuate portions being spaced from said first plate and the end two arcuate portions being adjacent said first plate at the respective outer peripheral edges, thereby facilitating said compacting of said chemical and providing a moderate oxygen stream over a prolonged period of time as the chemical undergoes the thermal reaction, said depression extending to an edge between said plates and being bevelled outwardly toward said edge, said edge being located at said openable end, and a foil closing said openable end.

2. An oxygen generator, comprising inner and outer juxtaposed deformable sheet metal cylinders, said outer cylinder being formed to define a continuous axially elongated serpentine recess covered by said inner cylinder having one end which is closed and an opposite end which is openable for ignition, said serpentine recess comprising a plurality of spaced parallel straight leg portions and interconnected curved portions, a granular chemical which generates oxygen by thermal reaction disposed in said recess, an ignition device in said recess adjacent the openable end of said recess for igniting said chemical, said cylinders being deformed by isostatic pressure to reduce the size of the recess so that said chemical is compacted therein, said recess having a cross-section comprising four arcuate portions which form a fluted surface in said recess, the middle two arcuate portions being spaced from said inner metal cylinder and the two end arcuate portions being adjacent to said inner metal cylinder at the respective outer peripheral edges to facilitate said compacting of said chemical and produce a moderate stream of oxygen when said chemical undergoes the thermal reaction, said recess extending to an edge between said cylinders and being beveled outwardly toward said edge, said edge being located at said openable end and a foil covering said openable end.

3. A process for manufacturing a chemical oxygen generator using a chemical which generates oxygen by thermal reaction and an ignition device for the chemical comprising, forming a continuous axially elongated serpentine recess on an internal surface of a first sheet metal cylinder, said serpentine recess comprising a plurality of spaced parallel straight leg portions interconnected by curved portions, placing the ignition device at one end of said depression, telescoping said first cylinder down over and into engagement with a second sheet metal cylinder part way to form a cavity between said first and second cylinders which is opened adjacent one side of said first and second cylinders, said first cylinder having an internal diameter adjacent the other side thereof which is substantially the same as the external diameter of said second cylinder for effectively closing the cavity adjacent said other side, covering said one side of said second cylinder with an auxiliary cone having an inclined surface extending toward the cavity opening, filling said cavity at least to overflowing with the oxygen-generating chemical which is granular through the cavity opening, thereafter telescoping said first cylinder further down onto said second cylinder to substantially close the opening of said cavity between said first and second cylinders leaving only the one end opening of said recess in which the ignition device is placed, sealing said first and second cylinders to each other to form a gas pipe connection therebetween, and subjecting said first and second cylinders and the chemical in said cavity to an external isostatic pressure which acts thereon on all sides so as to deform at least one of said cylinders to compact the chemical.

* * * * *